(12) United States Patent
Bleicken

(10) Patent No.: US 11,066,146 B1
(45) Date of Patent: Jul. 20, 2021

(54) CIRCUMFERENTIAL RING PROPULSORS AND CONTROL ASSEMBLIES FOR MANNED AND UNMANNED LIGHTER THAN AIR AIRCRAFT

(71) Applicant: Eric Bleicken, Portland, ME (US)

(72) Inventor: Eric Bleicken, Portland, ME (US)

( * ) Notice: Subject to any disclaimer, the term of this patent is extended or adjusted under 35 U.S.C. 154(b) by 0 days.

(21) Appl. No.: 15/929,931

(22) Filed: May 29, 2020

Related U.S. Application Data

(60) Provisional application No. 62/962,397, filed on Jan. 17, 2020.

(51) Int. Cl.
*B64B 1/26* (2006.01)
*B64B 1/32* (2006.01)

(52) U.S. Cl.
CPC . *B64B 1/26* (2013.01); *B64B 1/32* (2013.01)

(58) Field of Classification Search
CPC ... B63G 8/08; B63G 8/16; B63H 1/16; B63H 25/48; B63H 5/10; B63H 5/14; B63H 2023/005; F42B 19/01; F42B 19/12; B64B 1/26; B64B 1/32; B64B 1/00; B64B 1/24
USPC ............... 114/20.1, 23, 321, 330, 337, 338; 415/129; 440/79, 6, 66; 244/24, 25, 26, 244/27, 28, 29, 30, 31, 32, 33
See application file for complete search history.

(56) References Cited

U.S. PATENT DOCUMENTS

| | | | | |
|---|---|---|---|---|
| 5,856,719 A | * | 1/1999 | De Armas | H02K 7/09 310/103 |
| 8,585,451 B2 | * | 11/2013 | Bleicken | B63H 5/10 440/79 |
| 9,227,709 B1 | * | 1/2016 | Schill | B63H 23/326 |

* cited by examiner

*Primary Examiner* — Anthony D Wiest
(74) *Attorney, Agent, or Firm* — Caseiro Burke LLC; Chris A. Caseiro

(57) ABSTRACT

A propulsor and control system for a Lighter Than Air (LTA) aircraft having annular fore and aft circumferential shrouds surrounding the aircraft body. The fore and aft circumferential shrouds form respective fore and aft circumferential shroud gaps between the fore and aft circumferential shrouds and the LTA aircraft body. Fore and aft propulsor blades are situated substantially or completely within the fore and aft circumferential shroud gaps. The blades counter-rotate in one embodiment. The fore and aft circumferential ring propulsors can have front control vanes located in front of the respective propulsors blade sets, and back control vanes located behind the respective propulsors to control the direction of the flow of air in order to maneuver the LTA aircraft. Magnetic levitation may be used to actuate the propulsor blade sets.

17 Claims, 4 Drawing Sheets

CIRCUMFERENTIAL RING PROPULSORS AND CONTROL ASSEMBLIES FOR MANNED AND UNMANNED LIGHTER THAN AIR AIRCRAFT

BACKGROUND

Field of the Invention

This invention relates to a propulsor system and control assemblies for Lighter Than Air (LTA) aircraft such as blimps; dirigibles; non-rigid, semi-rigid and rigid airships, that utilize hot air or LTA gas to maintain neutral buoyance during flight.

Description of the Art

LTA aircraft have traditionally been driven by one or more engine driven propellers. Nearly all have used a central shaft with hub mounted blades radiating outward that provide thrust for forward or reverse motion. Maneuvering and control of LTA aircraft is made with a system of rudders and horizontal planes protruding from the aircraft's body. However, for the rudders and ailerons to function, air must flow across their surfaces; therefore, forward or reverse speed must be maintained in order to maneuver, making maneuvering in a hovering mode difficult if not impossible.

With advances in technology and the broadening of requirements for LTA aircraft, there is a growing need for systems that can function at very high altitudes, that can loiter persistently (months and years), and can operate over longer distances and at increased speeds. At altitudes above 100,000 feet, LTA aircraft operate above normal commercial and military flight paths and beyond the range of most military missiles. Furthermore, these extreme altitudes are also above most environmental risks associated with violent wind and weather. In addition, it is highly desirable that LTA aircraft are able maneuver while hovering. This is particularly important when launching and recovering LTA aircraft at low altitude under windy conditions.

SUMMARY OF THE INVENTION

This invention is for LTA aircraft such as blimps; dirigibles, non-rigid, semi-rigid and rigid airships, that utilize hot air or LTA gas to maintain neutral buoyance during flight. In one of the embodiments, the present invention is directed toward a circumferential ring propulsor and control assembly consisting of a plurality of annular circumferential ring propulsors capable of rotating in opposite directions (but not always rotating in opposite directions such as at maneuvers with no way forward or sternway). In one embodiment, one circumferential ring propulsor is fore of midships and one circumferential ring propulsor is aft of midships, and each of the circumferential ring propulsors are covered by its own shroud. In embodiment, control vanes are placed before and after the propulsor blade sets in order to maneuver the LTA vehicle. The control vanes may be adjusted individually to direct the flow of air in different directions so as to allow for directing and maneuvering of the LTA vehicle.

In one embodiment of the invention, the power source and mechanical elements such as control vane actuators are housed within the LTA aircraft's body.

In one embodiment of the invention, the power source and mechanical elements such as control vane actuators are housed within the shroud and outboard (i.e., in a lateral direction from the aircraft body) of the annular gaps.

The embodiments discussed in this summary section do not represent the only embodiments of this invention.

The Circumferential Ring Propulsors and Control Assemblies for LTA Aircraft includes two counter-rotating circumferential propulsors and control vanes operating between shrouds and the LTA aircraft's body.

Propulsor blade sets operate in the annular gaps between shrouds surrounding the LTA's body, forward and aft of midships. The shrouds may, or may not, contain part or all of the power source for the propulsor as well as actuator mechanisms for the control vanes. Shrouds also provide protection against propulsor blade damage and fouling and improve propulsive thrust characteristics. The two propulsor assemblies counter-rotate in order to neutralize torque from the propulsors on the LTA vehicle.

Control Vanes are placed between the propulsor shrouds and the aircraft body to direct the flow of air through the forward and aft propulsors to provide both vertical plane and horizontal steering authority. Because these control vanes use the flow of both the forward and after propulsion assemblies, a greater degree of response is anticipated, as well as forces that can be varied independent of attitude or heading change. It is expected that this will give an improved standard of over-all aircraft controllability. The system will also eliminate the need for protruding horizontal planes and rudders, thus reducing the probability of fouling or damage due to ground contact or collision with objects and above ground structures.

The proposed propulsor blade sets, acting in consort with control vanes fore and aft of the propulsor blades, provide an opportunity for improved interaction between the propulsor and LTA aircraft's body resulting in greater speed, improved range, and quieter operations. Because the propulsor blades and control vanes are protected by a shroud, their susceptibility to damage is greatly reduced.

At low speed rotation of the propulsors, a hovering mode can be accomplished by powering the forward and aft propulsors in opposite directions. By activating the control vanes, maneuvers of any kind, within a three-dimensional air space becomes achievable: sideways, vertical, rotation in place, or maintaining any angular attitude. Thus, controlled maneuvering within a confined space such as a blimp hanger is possible.

Power for the invention may be diesel engine, nuclear reactor, fuel cell, solar, battery or other sources.

The circumferential propulsor rings may be mechanically driven or magnetically levitated. For example, for a magnetic levitation mechanism that is coupled to the shrouds and the rings, a permanent magnet motor may be used for driving the propulsor ring combined with some magnetic bearings at the rings for levitation/stabilization. Alternatively, rim driven propulsion, also referred to as rim driven thrust using one or more rim drive thrusters, may be suitable as a mechanism for driving the propulsor rings.

BRIEF DESCRIPTION OF THE DRAWINGS

Reference is made to the accompanying drawings in which are shown illustration embodiments of the invention from which its novel features and advantages will be apparent in the drawings:

Two fundamental designs alternatives are likely, in which (a) all mechanical elements are housed within the shroud and outboard (i.e., in a lateral direction from the aircraft body) of the annular gaps as seen in FIG. 2, FIG. 3, FIG. 4 and FIG. 5; and (b) all mechanical elements are imbedded in the LTA vehicle aircraft body and inboard of the annular gaps as seen in FIG. 6, FIG. 7, FIG. 8 and FIG. 9.

FIG. 5 is a perspective view of the aft circumferential ring propulsor and control assembly showing the positioning of the propulsor blades and fore and aft control vanes mounted within the aft shroud. (The LTA aircraft's body is not shown.)

DETAILED DESCRIPTION OF THE INVENTION

The present invention is directed to circumferential ring propulsors and control assemblies for manned or unmanned LTA aircraft. What follows constitutes a description of some of the embodiments of the invention. This detailed description of the invention is not meant to limit the scope of the claims to the embodiments herein described.

Figure 1:
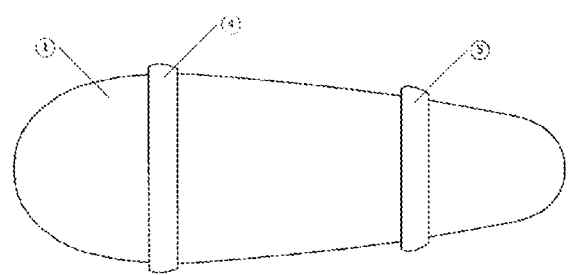
FIG. 1 is a side elevation of the LTA vehicle showing the general location of the fore and aft circumferential ring propulsor and control assemblies.

As can be seen in FIG. 1, there is a plurality of circumferential shrouds having a fore-circumferential shroud (4) and an aft-circumferential shroud (5) that surround a fore circumferential ring propulsor and control assembly (2) and an aft circumferential ring propulsor and control assembly (3). In one embodiment of the invention, both the fore-circumferential shroud (4) and the aft-circumferential shroud (5) are substantially or completely annular and surround an aircraft body (1) of the LTA aircraft.

Figure 2:
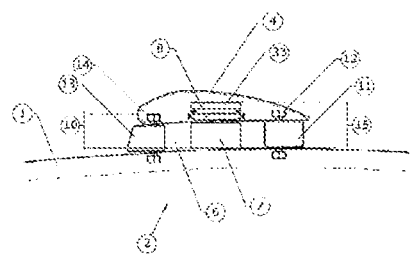
FIG. 2 is a side, cross-sectional view of the fore circumferential ring propulsor with the power source, propulsor assembly and control vanes mounted within the shroud and outboard of the LTA aircraft's body.
Figure 6:
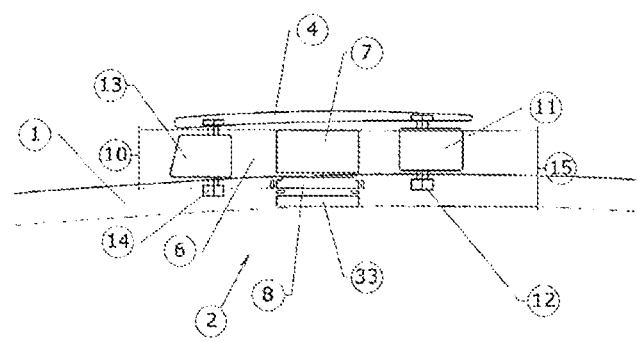
FIG. 6 is a cross-sectional view of the fore circumferential propulsor and control assembly wherein the power source and drive assembly are located within the LTA aircraft's body.

As can be seen in both FIG. 2 and FIG. 6, cross-sectional views of the fore circumferential ring propulsor, the fore-circumferential shroud (4) forms a fore-circumferential shroud gap (6) between the fore-circumferential shroud (4) and the aircraft body (1). In one embodiment of the invention, the fore-circumferential shroud gap (6) is substantially or completely annular.

Figure 3:
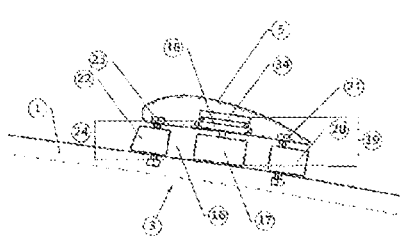
FIG. 3 is a cross-sectional view of the aft circumferential ring propulsor with the power source, propulsor assembly and control vanes mounted within the shroud and outboard of the LTA aircraft's body.
Figure 7:
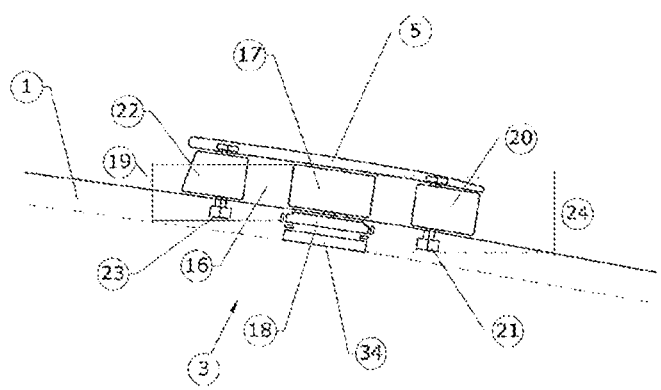
FIG. 7 is a cross-sectional view of the aft circumferential ring propulsor and control assembly wherein the power source and drive assembly are located within the LTA aircraft's body.

As can be seen in FIG. 3 and FIG. 7, cross-sectional views of the aft circumferential ring propulsor, the aft-circumferential shroud (5) forms an aft-circumferential shroud gap (16) between the aft-circumferential shroud (5) and the (1) aircraft body. In one embodiment of the invention, the aft-circumferential shroud gap (16) is substantially or completely annular.

As can be seen in both FIG. 2 and FIG. 6, cross-sectional views of the fore circumferential ring propulsor, fore-propulsor blades (7) are situated within the fore-circumferential shroud gap (6) substantially or completely between the fore-circumferential shroud (4) and the aircraft body (1).

Figure 4:
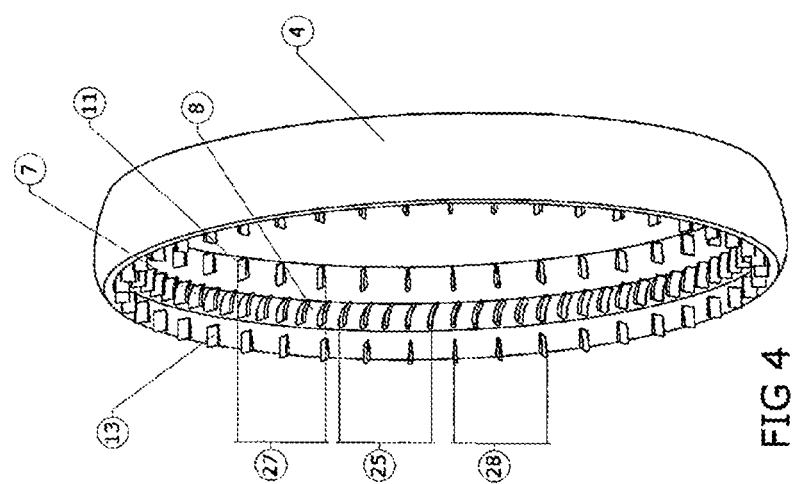
FIG. 4 is a perspective view of the fore circumferential ring propulsor and control assembly showing the positioning of the propulsor blades and fore and aft control vanes mounted within the shroud. (The LTA aircraft's body is not shown.)

As seen in FIG. 4, the perspective view of the fore circumferential ring propulsor and control assembly, the fore-propulsor blades (7) form a fore-propulsor blade set (25). The fore propulsor blade set (25) mounted on the fore propulsor hub (8) comprise the fore propulsor hub assembly (10) as seen in FIGS. 2 and 6.

Figure 9:
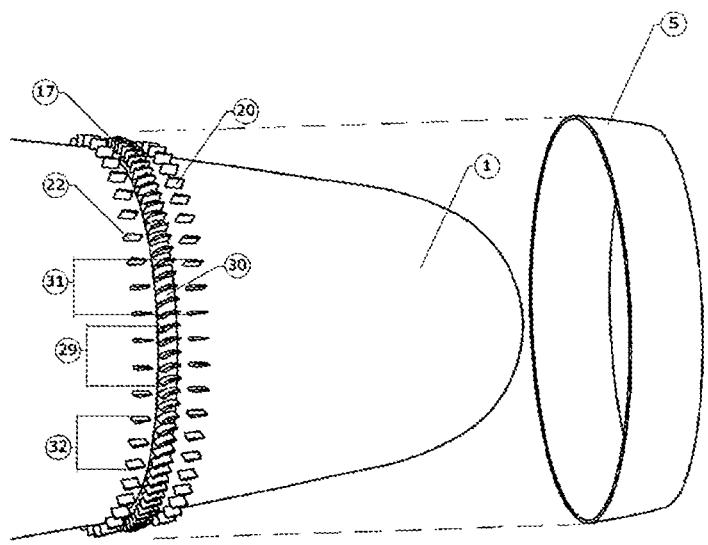
FIG. 9 is an exploded, perspective view of the aft circumferential ring propulsor and control assembly with the aft shroud offset in order to display the propulsor blades and control vanes that are mounted and controlled within the body of the LTA aircraft.

As can be seen in FIG. 3 and FIG. 7, cross-sectional views of the aft circumferential ring propulsor, aft-propulsor blades (17) are situated within the aft-circumferential shroud gap (16) substantially or completely between the aft-circumferential shroud (5) and the aircraft body (1). Said aft propulsor blade set (29) as seen in FIG. 5 and FIG. 9 are mounted on the aft propulsor hub (18) and include the aft propulsor hub assembly (19) as seen in FIG. 3 and FIG. 7.

Figure 5:
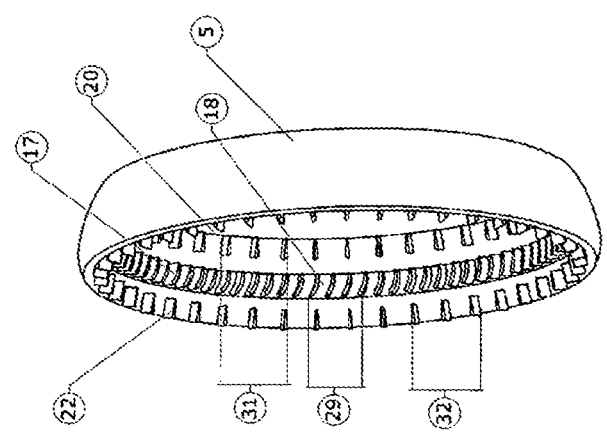

As seen in FIG. 5, the perspective view of the aft circumferential ring propulsor and control assembly, the aft-propulsor blades (17) form an aft-propulsor blade set (29).

As can be seen in FIG. 3 and FIG. 7, cross-sectional views of the aft circumferential ring propulsor, aft-back-control vanes (20) are located behind the aft-propulsor blades (17). The position of the aft-back-control vanes (20) may be adjusted to direct the flow of air from the aft-propulsor blade (17) and control horizontal and vertical steering authority. In one embodiment of the invention, the aft-back-control vanes (20), that are individually connected to the aft-back vane control actuator (21), are located behind the aft-propulsor blades set (29) as shown in the perspective view of FIG. 5, of the aft circumferential ring propulsor and control assembly and are substantially or completely within the aft-circumferential shroud gap (16) as shown in FIGS. 3 and 7. In FIG. 5, the perspective view of the aft circumferential ring propulsor and control assembly, it can also be seen that the position of the aft-back-control vanes (20) may be adjusted to direct the flow of air from the aft-propulsor blade set (29) [formed from the collection of aft-propulsor blades (17)] and control horizontal and vertical steering authority.

The fore-propulsor blade set 25 formed from the collection of fore propulsor blades 7 as shown in FIG. 4 and the aft-propulsor blade set formed from the collection of aft propulsor blades 7 as shown in FIG. 5 usually rotate in opposite directions. While the circumferential ring propulsors (2 and 3) are not explicitly shown in FIG. 1 but are shown in FIGS. 2 and 3 respectively, the circumferential ring propulsors (in one embodiment of the invention) are substantially or completely underneath the shrouds and are housed by the shrouds and run parallel with the shrouds. FIG. 1, which shows the side elevation of the LTA aircraft, shows the general location of the fore and aft shrouds (4 & 5) and indicates (without explicitly showing) the general location for the fore and aft circumferential ring propulsor sets (25 & 29) and the accompanying control vane sets (25,27,29, 31), because the propulsor sets (25 & 29) and control vane sets (27,28,31, 32) are substantially or completely beneath the shrouds (4 & 5), in one of the embodiments of the invention. In one of the embodiments of the invention, the fore propulsor blade set (25) and the aft propulsor blade set (29) are capable of rotating in opposite directions, especially when the LTA vehicle is underway. In some tight maneuvering situations at low speed, the fore propulsor blade set (25) and the aft propulsor blade set (29) that are mounted on the fore and aft blade set hubs (26) and (30) may rotate in the same direction.

As shown in FIG. 1, in one of the embodiments of the invention, the fore-circumferential shroud (4) is situated forward of midships, and aft-circumferential shroud (5) is locate aft of midships. In one of these embodiments, the fore propulsor blade set (25) and the fore control vane sets (27 & 28) are located fore of midships underneath the fore shroud (4), and the aft propulsor blade set (29) and the aft control vane sets (31 & 32) are located aft of midships underneath the aft shroud 5).

However, it is also contemplated that the fore-circumferential shroud (4) and the accompanying fore propulsor blade set (25) and the fore control vane sets (27 & 28) could all be situated substantially amidships, while the aft-circumferential shroud (5) and the accompanying aft propulsor blade set (29) and aft control vanes (31 & 32) could all be placed substantially aft of midships.

In one embodiment of the invention, as can be seen in both FIG. 2 and FIG. 6, cross-sectional views of the fore circumferential ring propulsor, fore-back-control vanes (11) are located behind the fore-propulsor blades (7). The position of the fore-back-control vanes (11) may be individually adjusted to direct the flow of air from the fore-propulsor blade (7) and control horizontal and vertical steering authority. As seen in FIG. 4, the perspective view of the fore circumferential ring propulsor and control assembly (2), in one embodiment of the invention, the fore-back-control vanes (11), that are individually connected by a fore-back control vane actuator (12), are located behind the fore-propulsor blades set (25) formed from the collection of fore-propulsor blades (7) and are substantially or completely within the fore-circumferential shroud gap (6) as shown in FIGS. 2 and 6.

As can be seen in FIG. 3 and FIG. 7, cross-sectional views of the aft circumferential ring propulsor (3), in one of the embodiments of the invention, aft-front-control vanes (22) are located in front of the aft-propulsor blades (17), and are individually connected by the aft-front control vane actuator (23). As can be seen in FIG. 5, the perspective view of the aft circumferential ring propulsor and control assembly, in one embodiment of the invention, the position of the aft-front-control vanes (22) may be adjusted to direct the flow of air from the aft-propulsor blade set (29) formed from the collection of aft-propulsor blades (17) when it is reversed. As can be seen in FIG. 5 in conjunction with FIGS. 3 and 7, in one embodiment of the invention, the aft-front-control vanes set (32) formed from the collection of aft-front control vanes (22) and shown in FIG. 5 is situated substantially or completely within the aft-circumferential shroud gap (16) as shown in FIGS. 3 and 7.

As can be seen in FIG. 2 and FIG. 6, cross-sectional views of the fore circumferential ring propulsor, in one of the embodiments of the invention, fore-front-control vanes (13) are located in front of the fore-propulsor blades (7), and are individually connected by the fore-front vane control actuator (14). As can be seen in FIG. 4, the perspective view of the fore circumferential ring propulsor and control assembly, in one embodiment of the invention, the position of the fore-front-control vanes (13) may be adjusted to direct the flow of air from the fore-propulsor blade set (25) formed from the collection of fore-propulsor blades (7) when it is reversed. As can be seen in FIG. 4 in conjunction with FIGS. 2 and 6, in one embodiment of the invention, the fore-front-control vanes set (28) formed from the collection of fore-front control vanes (13), being individually connected by fore-front vane control actuator (14) and shown in FIG. 4 is situated substantially or completely within the fore-circumferential shroud gap (6) as shown in FIGS. 2 and 6.

At least two placements for the fore drive assembly (15) and the aft drive assembly (24) are contemplated. The first one is where the power sources (33 & 34) and drive assemblies (15 & 24) are located within the LTA aircraft's body, as shown in FIGS. 6, 7, 8, and 9. The second embodiment is one where the power sources (33 & 34) and drive assemblies (15 & 24) are located in each of the two shrouds (4 & 5) driving its respective counter-rotating circumferential ring propulsors (2 & 3) as shown in FIGS. 2, 3, 4 and 5.

FIG. 6 is a cross-sectional view of the fore circumferential propulsor and control assembly wherein the fore power source (33) and fore drive assembly (15) are located within the LTA aircraft's body (1). FIG. 7 is a cross-sectional view of the aft circumferential ring propulsor and control assembly wherein the aft power source (34) and aft drive assembly (24) are located within the LTA vehicle aircraft body (1). The power sources 33 and 34 may be motors, for example. In a first alternative, they may comprise magnetic levitation magnets and drives on or in the aircraft body (1), with opposing magnets affixed to or contained in the blades 7 and 17 for controlling movement of those blades. In a second alternative, a rim drive thruster apparatus may be employed to move the blades 7 and 17.

Figure 8:
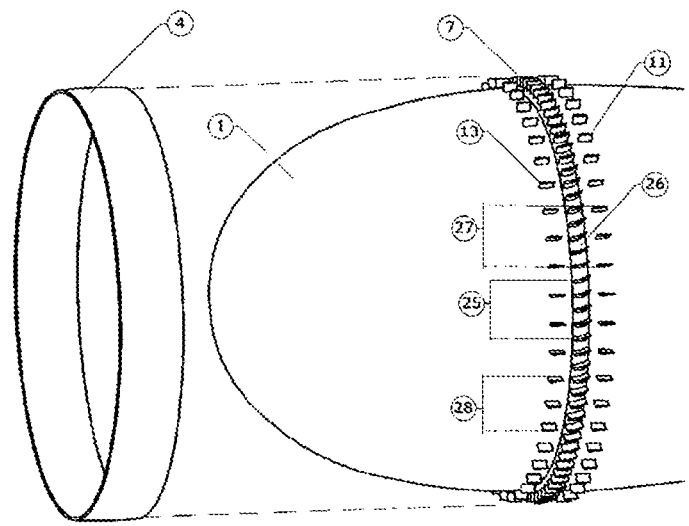
FIG. 8 is an exploded, perspective view of the fore circumferential ring propulsor and control assembly with the fore shroud offset in order to display the propulsor blades and control vanes that are mounted and controlled within the body of the LTA aircraft.

FIGS. 2, 4, and 6 show fore-back control vanes (11) located behind the fore-propulsor blades (7). As shown in FIG. 8, the position of the fore-back control vanes 11 that constitute the fore-back control vane set (28) may be adjusted to direct the flow of air from the fore-propulsor blade set (25) (made up of the group of fore-propulsor blades (7)] to control horizontal and vertical steering authority.

In one of the embodiments, the individually adjustable control vanes (11, 13, 20 & 22) direct the flow of air from the propulsor blade sets (25 & 29) substantially at right angles to the cross-sectional radius of the LTA aircraft (1).

The respective drive assemblies (15 & 24), drive the fore and aft counter-rotating circumferential ring propulsors (2 & 3). As described in view of FIGS. 5, 6, 7, 8 and 9, the drive assemblies (15 & 24) may be located in the aircraft body of the LTA aircraft (1).

The respective fore and aft drive assemblies (15 & 24) include the respective fore and aft power sources (33 & 34) and the hub (8 & 18) of each of the respective propulsor blade sets (25 & 29).

What is claimed is:

1. A propulsor system for a Lighter Than Air (LTA) aircraft having an aircraft body, the system comprising:
    a plurality of circumferential shrouds, wherein said plurality of circumferential shrouds include a fore-circumferential shroud and an aft-circumferential shroud,
    wherein said fore-circumferential shroud forms a fore-circumferential shroud gap between the fore-circumferential shroud and the aircraft body,
    wherein said aft-circumferential shroud forms an aft-circumferential shroud gap between the aft-circumferential shroud and the aircraft body;

fore-propulsor blades within the fore-circumferential shroud gap between the fore-circumferential shroud and the aircraft body,
wherein said fore-propulsor blades form a fore-propulsor blade set;
aft-propulsor blades within the aft-circumferential shroud gap between the aft-circumferential shroud and the aircraft body,
wherein said aft-propulsor blades form an aft-propulsor blade set;
an actuation mechanism to cause movement of the fore-propulsor blades and the aft-propulsor blades; and
aft-back control vanes located behind the aft-propulsor blades,
wherein a position of the aft-back-control vanes may be individually adjusted to direct the flow of air from the aft-propulsor blade set and control horizontal and vertical steering of the LTA aircraft,
wherein said fore-propulsor blades and said aft-propulsor blades rotate in opposite directions when the LTA aircraft is moved in forward or reverse and in the same direction to move air in opposing directions to enable maneuvering of the LTA aircraft while hovering.

2. The propulsor system for a LTA aircraft of claim 1 wherein the actuation mechanism is a magnetic levitation mechanism coupled to said aircraft body, said fore-propulsor blade set and said aft-propulsor blade set.

3. The propulsor system for a LTA aircraft of claim 1 wherein said actuation mechanism is a rim driven thruster.

4. The propulsor system for a LTA aircraft of claim 1 wherein said aft-back-control vanes located behind the aft-propulsor blades are set within the aft-circumferential shroud gap.

5. The propulsor system for a LTA aircraft of claim 4 wherein said fore-circumferential shroud is substantially annular, said aft-circumferential shroud is substantially annular, said fore-circumferential shroud gap between the fore-circumferential shroud and the aircraft body is substantially annular, and said aft-circumferential shroud gap between the aft-circumferential shroud and the aircraft body is substantially annular.

6. The propulsor system for a LTA aircraft of claim 5 further comprising fore-back-control vanes located behind the fore-propulsor blades and wherein a position of the fore-back-control vanes may be individually adjusted to direct the flow of air from the fore-propulsor blade and control horizontal and vertical steering of the LTA aircraft.

7. The propulsor system for a LTA aircraft of claim 6 wherein said fore-back-control vanes located behind the fore-propulsor blades are set within the fore-circumferential shroud gap.

8. The propulsor system for a LTA aircraft of claim 7 further comprising aft-front-control vanes located in front of the aft-propulsor blades and wherein the position of the aft-front-control vanes may be individually adjusted to direct the flow of air from the aft-propulsor blade set when the LTA aircraft is reversing and said aft-front-control vanes are set within the aft-circumferential shroud gap.

9. The propulsor system for a LTA aircraft of claim 8 further comprising fore-front-control vanes located in front of the fore-propulsor blades and wherein the position of the fore-front-control vanes may be individually adjusted to direct the flow of air from the fore-propulsor blade set when the LTA aircraft is reversing and said fore-front-control vanes are set within the fore-circumferential shroud gap.

10. The propulsor system for a LTA aircraft of claim 9 wherein said fore-propulsor blades and said aft-propulsor blades rotate in opposite directions.

11. The propulsor system for a LTA aircraft of claim 10 wherein said fore-circumferential shroud is situated forward of midway of the aircraft body and said aft-circumferential shroud is situated aft of midway of the aircraft body.

12. The propulsor system for a LTA aircraft of claim 11 wherein said fore-propulsor blades within the fore-circumferential shroud gap are driven by a drive assembly located within the fore-circumferential shroud and said aft-propulsor blades within the aft-circumferential shroud gap are driven by a drive assembly located within the aft-circumferential shroud.

13. The propulsor system for a LTA aircraft of claim 10 wherein said fore-circumferential shroud is situated substantially midway of the aircraft body and said aft-circumferential shroud is situated aft of midway of the aircraft body.

14. The propulsor system for a LTA aircraft of claim 1 further comprising fore-back-control vanes located behind the fore-propulsor blades wherein the position of the fore-back-control vanes may be individually adjusted to direct the flow of air from the fore-propulsor blade set to control horizontal and vertical steering of the aircraft body.

15. A propulsor system for a Lighter Than Air (LTA) aircraft having an aircraft body, the system comprising:
two shrouds joined to the aircraft body of the LTA aircraft each forming an annular gap between the aircraft body and the shrouds;
two counter-rotating circumferential ring propulsors each with a set of blades,
wherein the set of blades of one of the propulsors is positioned within one of the annular gaps formed by one of the shrouds and the set of blades of the other of the propulsors is positioned within the other of the annular gaps formed by the other of the shrouds,
wherein the blades of the two propulsors are in a fixed position mounted on hubs;
a magnetic levitation mechanism coupled to said aircraft body and said two counter-rotating circumferential ring propulsors; and
circumferential shrouds, said fore-propulsor blade set and said aft-propulsor blade set; and
two sets of individually adjustable control vanes, wherein each of the two sets of vanes is located in the annular gaps behind respective ones of the two set of propulsor blades directing the flow of air from the blade sets substantially at right angles to the aircraft body of the LTA aircraft,
wherein the set of blades of the one of the propulsors and the set of blades of the other of the propulsors rotate in opposite directions when the LTA aircraft is moved in forward or reverse and in the same direction to move air in opposing directions to enable maneuvering of the LTA aircraft while hovering.

16. The propulsor system for a LTA aircraft of claim 15 wherein one of the two counter-rotating circumferential ring propulsors is located fore of midway of the aircraft body and the other of the two counter-rotating circumferential ring propulsors is located aft of midway of the aircraft body.

17. The propulsor system for a LTA aircraft of claim 15 wherein the individually adjustable control vanes are located in front of each of the respective two propulsor blade sets within the annular gaps.

* * * * *